INVENTOR
ROBERT F. MOZLEY
BY
ATTORNEY

INVENTOR
ROBERT F. MOZLEY
BY
Paul B. Hunter
ATTORNEY

Feb. 12, 1963

R. F. MOZLEY 3,077,592

RADAR SYSTEM RANGING UNIT

Filed Feb. 26, 1947

INVENTOR
ROBERT F. MOZLEY
BY
Paul B. Hunter,
ATTORNEY

United States Patent Office 3,077,592
Patented Feb. 12, 1963

3,077,592
RADAR SYSTEM RANGING UNIT
Robert F. Mozley, Berkeley, Calif., assignor to Sperry Rand Corporation, a corporation of Delaware
Filed Feb. 26, 1947, Ser. No. 730,934
5 Claims. (Cl. 343—7.3)

This invention relates in general to radio detection and ranging or radar systems, and more particularly to improved ranging units for use in such systems. The present application is a continuation-in-part of application Serial No. 658,051 filed March 29, 1946, now Patent No. 2,786,197, issued on March 19, 1957, and having the same assignee as the present application.

In a radar system, high-powered bursts of electromagnetic energy are transmitted from a directional antenna into space. When any of this energy strikes an object or target, a small part of it is reflected back to the source and picked up by a suitable receiver. The reflected or "echo" signal provides information as to the direction and range or distance of the object causing the reflection.

In general, a radar system has two principal modes of operation. In the first, called "search," the radar beam automatically searches over a selected area for possible targets which show as bright spots on the face of a cathode-ray indicator tube. The term "search" may refer to range as well as direction; that is, the radar system may be adapted not only to sweep a selected area for a possible target, but also to vary its effective range periodically in an attempt to locate the target.

The second mode of operation of a radar system, called "track," is employed after a target has been located. The radar beam is caused to have a direction which continuously intercepts the target regardless of movement thereof and, in addition, the means for providing range information may also automatically adjust itself as the distance from the radar system to the selected target varies.

The portion of the radar system which provides information as to the range of the target is conveniently referred to as the ranging unit. The present invention is concerned solely with improvements in such ranging units.

Various functions must be performed by the ranging unit. One of these is to distinguish between the desired echo signal and signals from other targets or spurious responses generally referred to as "noise." Means must also be provided to prevent the ranging unit from responding to the high-powered transmitted pulses which tend to appear in the output of the receiver through leakage or other causes, and to targets beyond the desired maximum range.

In previously disclosed radar systems, the ranging unit has employed a narrow gate for the purpose of discriminating between targets and for minimizing the effects of noise, and an electronic servo loop has been provided to maintain the narrow gate over the echo signal at all times. The position of the narrow gate, therefore, may be made to furnish ranging data in the form of a voltage which is directly proportional to the distance between the radar system and the selected target. A wide gate is also generally provided for rendering the ranging unit inoperative during the transmission of the high-powered pulses, and non-responsive to reflected signals from targets beyond a given maximum range.

An object of the present invention is to provide an improved ranging unit for radar systems capable of furnishing extremely accurate ranging data.

Another object of the present invention is to provide a radar system ranging unit which is capable of automatically searching for and locating a single target, and then of automatically tracking the chosen target.

A further object of this invention is the provision of a ranging unit in a radar system which is capable of selecting automatically, from a plurality of targets having different ranges, the nearest target.

An additional object of the present invention is to provide a ranging unit for a radar system in which the difference between the strength of the echo signal and the noise level is utilized to determine when the mode of operation changes automatically from search to track.

The invention in another of its aspects relates to novel features of the instrumentalities described herein for achieving the principal objects of the invention and to novel principles employed in those instrumentalities, whether or not these features and principles are used for the above principal objects or in the same field.

A further object of the invention is to provide improved apparatus and instrumentalities embodying novel features and principles, adapted for use in realizing the above objects and also adapted for use in other fields.

The above and other objects and features of the invention will be better understood by reference to the following description taken in connection with the accompanying drawings, in which like components are designated by like reference numerals and in which.

Figure 2:
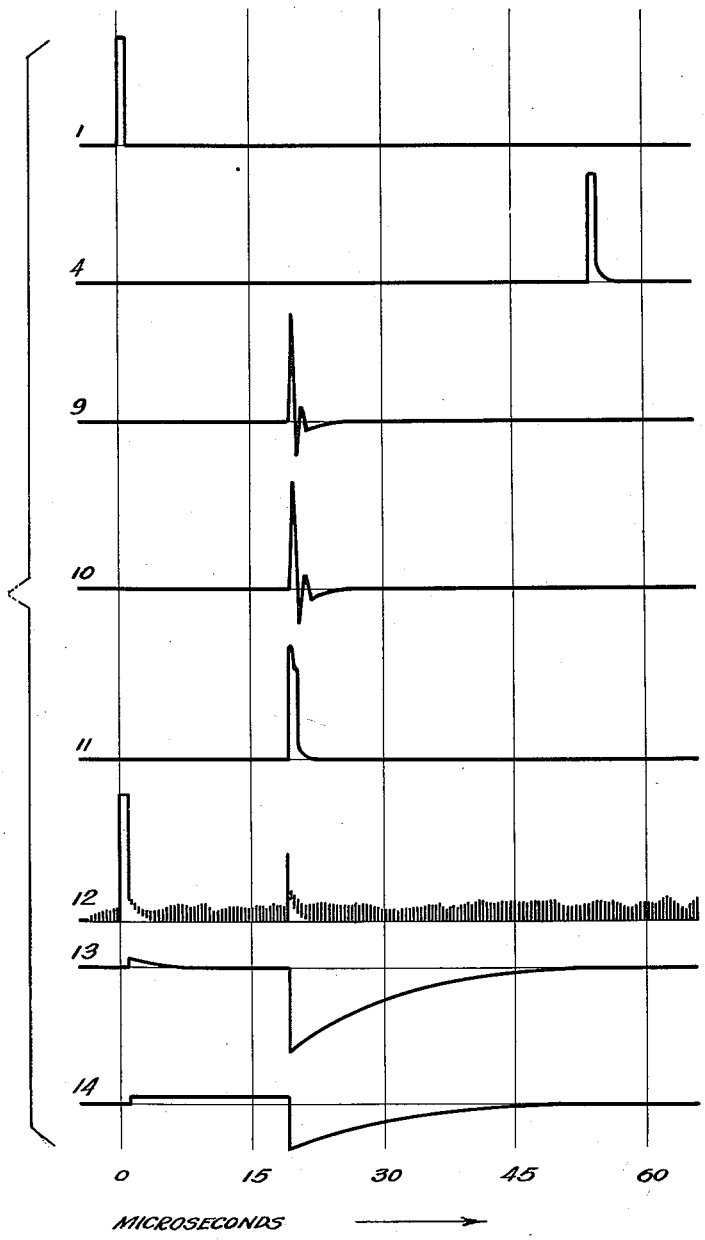
FIGS. 2–4 are graphical representations of the wave forms which exist in various portions of the system of FIG. 1.
Figure 3:
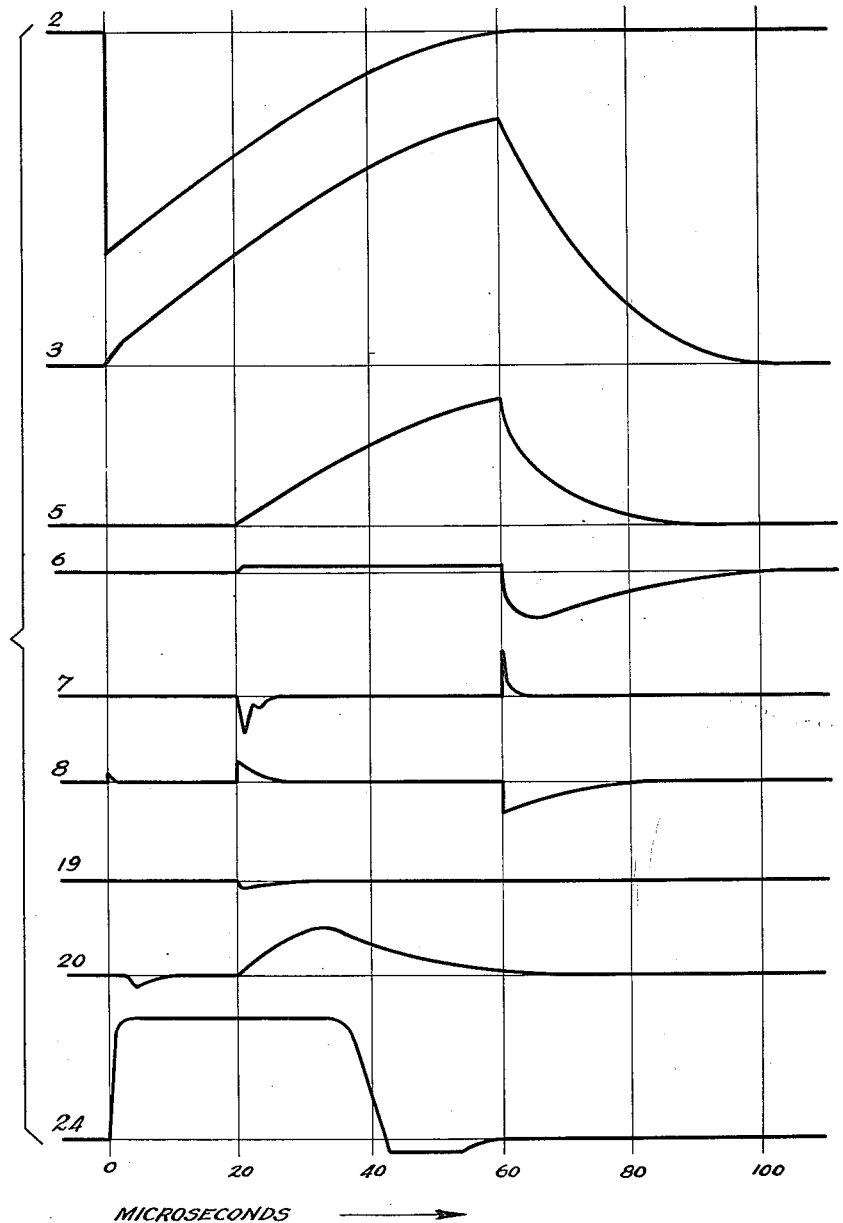
Figure 4:
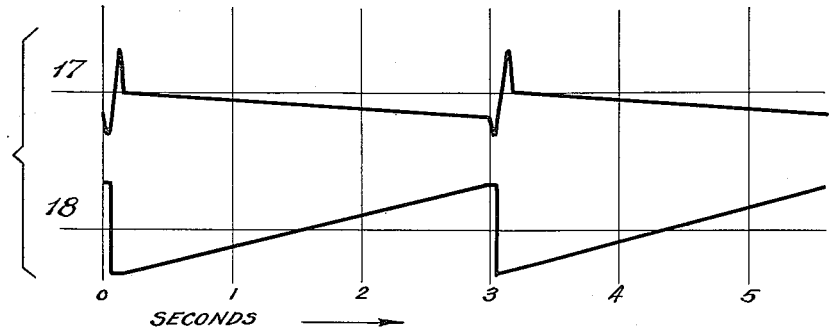

In the drawings, the encircled reference numerals refer to the corresponding curves or wave shapes of FIGS. 2–4. Reference will be made to these curves throughout the following description as an aid to a better understanding of the operation of the present invention.

Figure 1:
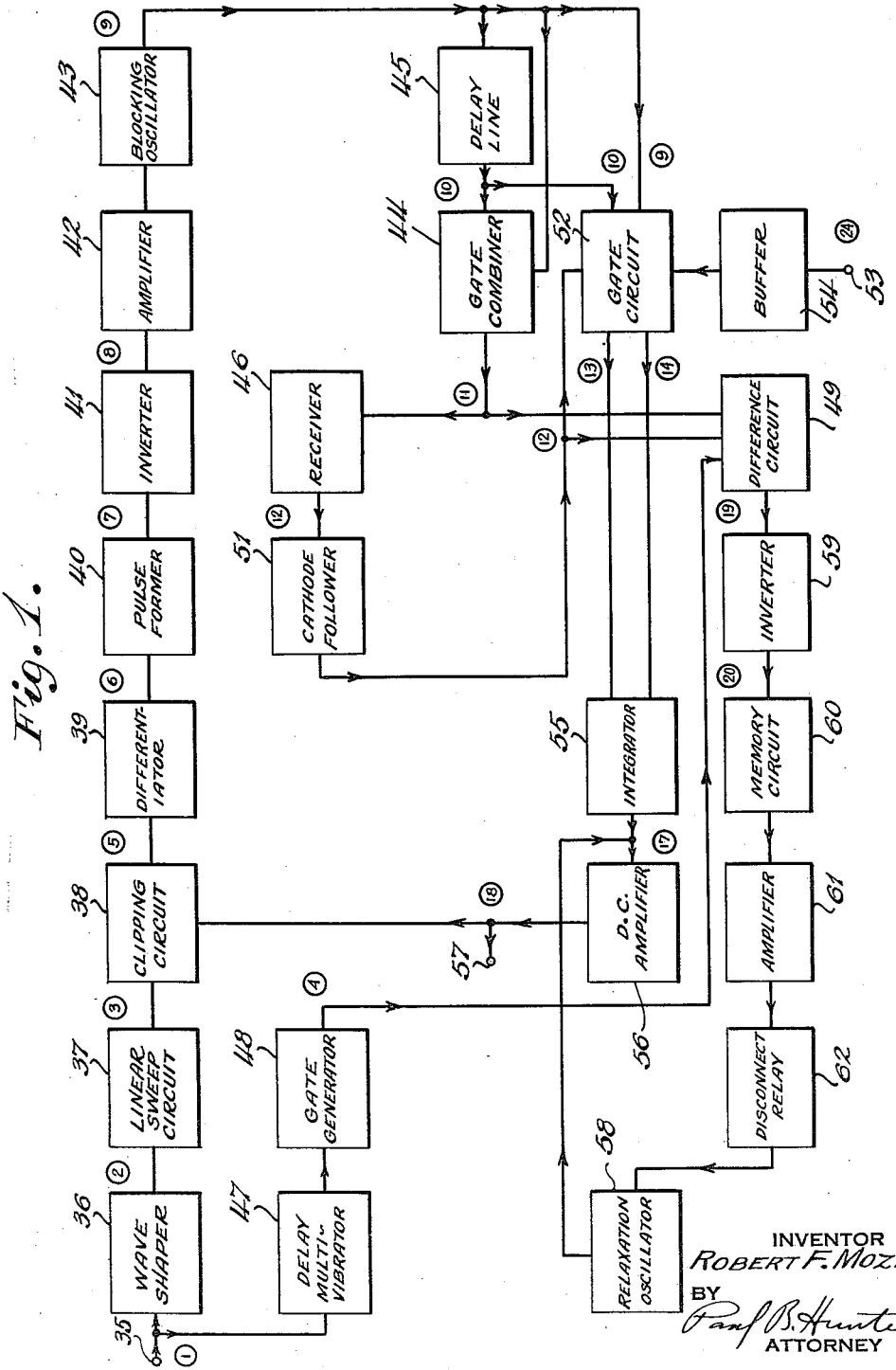
FIG. 1 represents, in block form, a portion of a radar system including an improved ranging unit in accordance with the present invention.

Referring now to FIG. 1, a positive synchronizing pulse (curve 1) is supplied by the modulator unit (not shown) of the radar system, and is in phase with the high-powered transmitted pulse. This positive synchronizing pulse is supplied, through terminal 35, to a wave shaper 36 the function of which is to convert the positive synchronizing pulse into a negative saw-tooth wave (curve 2).

The output of wave shaper 36 is applied to a linear sweep circuit 37, which develops a saw-tooth wave of the form shown in curve 3. This saw-tooth wave is subjected to clipping, at a level determined in a manner which will be described below, in clipping circuit 38.

The delayed saw-tooth wave (curve 5) constituting the output of circuit 38 is subjected to differentiation in a differentiator 39, to produce a wave of the form shown in curve 6. This wave in turn is converted to a pulse wave (curve 7) by a pulse former 40. After being subjected to inversion in an inverter 41, so that it has the wave form illustrated in curve 8, the wave is amplified by unit 42 and supplied to a blocking oscillator 43 to serve as a trigger therefor.

The output (curve 9) of blocking oscillator 43 may be designated as the "early gate." This early gate is supplied directly to a gate combiner 44, and also indirectly through a delay line 45, the output of which constitutes the "late gate" (curve 10).

The combination of the early and late gates, at the output of unit 44, comprises the narrow gate of the system (curve 11), which is supplied to the receiver 46, in which it may be used to gate the third detectors, for example, and to the difference circuit 49.

The means thus far described provide three separate gates which are locked together in time relationship and which can be made to vary in time of occurrence with respect to the synchronizing pulse (curve 1) by varying the level of clipping in clipping circuit 38. This may be accomplished automatically in the manner described below, so that the narrow gate is maintained in coincidence with the echo signal due to the selected target.

For the purpose of providing a noise gate, a delay multivibrator 47 of the non-self-oscillating or "slave" type is employed. Multivibrator 47, which is triggered by the positive synchronizing pulse at terminal 35, produces a pulse which is timed to occur when no echo signal is ever present. For example, this pulse may be delayed sufficiently to occur well after the echo signal from even the most remote target. This delayed pulse is supplied to a gate generator 48, which furnishes a noise gate (curve 4) to a difference circuit 49.

The output signal from receiver 46, commonly called the "video signal" (curve 12), passes through a cathode follower unit 51, which serves as a buffer. The video signal at the output of unit 51 is supplied to a gate circuit 52.

The early and late gates (curves 9 and 10) are also applied to gate circuit 52, in which the video signal (curve 12) is compared with each of them for time coincidence. In order to prevent the system from being responsive to the high-powered transmitted pulse, a wide gate (curve 24) is also supplied to gate circuit 52 through a terminal 53, and a buffer unit 54. The dual output (curves 13 and 14) of unit 52 is subjected to integration in integrator 55 and is then passed through unit 56, comprising a direct-current amplifier and cathode follower. The resultant, which comprises the difference between the integrated outputs of unit 52, is a direct-current voltage which is directly proportional in magnitude to the range of the selected target. This voltage is supplied as bias to clipping circuit 38, and may also be utilized, at a terminal 57, as a ranging voltage.

In operation, if the gates occur slightly early, the late gate will be combined with the video signal in unit 52 to produce a larger output voltage, so that the bias supplied to clipping circuit 38 will be greater and the gates will be delayed somewhat longer, and vice versa. Thus the above-described arrangement constitutes a complete electronic servo loop which is adapted to maintain the narrow gate in coincidence with the echo signal due to the selected target. In other words, means for tracking in range are provided. The means for securing automatic search in range will now be described.

A relaxation oscillator 58 is connected to the junction of units 55 and 56. When this oscillator is operating, the voltage at the junction has the form shown by curve 17. The output of unit 56, then, is as indicated by curve 18. The application of such a saw-tooth voltage as bias on clipping circuit 38 causes the narrow gate to sweep in range, slowly from short to long range, and then rapidly back to short range. Since the searching starts at a predetermined minimum range and continues outwardly, the system will automatically select the nearest target in a given direction. This range searching would continue indefinitely unless means were provided to render oscillator 58 inoperative as soon as the narrow gate coincides with an echo signal.

For the purpose of distinguishing between an echo signal and noise, difference circuit 49 is provided. This unit is supplied with the narrow gate (curve 11) from gate combiner 44, the video signal (curve 12) from cathode follower unit 51, and the noise gate (curve 4) from gate generator 48. When an echo signal is intercepted, a negative wave (curve 19) appears at the output of difference circuit 49 and is subjected to inversion in unit 59, so that it has the form shown by curve 20. This wave is supplied to a "memory circuit" 60, which acts somewhat as a peak voltmeter. The output of unit 60 is amplified by unit 61 and utilized to actuate a disconnect relay 62, which in turn renders relaxation oscillator 58 inoperative. They dual output (curves 13 and 14) of gate circuit 52, henceforth, serves to maintain the narrow gate in coincidence with the intercepted echo signal, as previously described, so that the system is now operating in its tracking mode. If the signal should disappear, circuit 60 will soon cause disconnect relay 62 again to render oscillator 58 operative, thereby automatically returning the system to search operation.

As stated above, one of the important features of the present invention is the provision of means for rendering the automatic switching from search to track substantially independent of noise. How this is accomplished will be explained in connection with FIG. 5 of the drawings, which shows in detail difference circuit 49 of FIG. 1.

Figure 5:
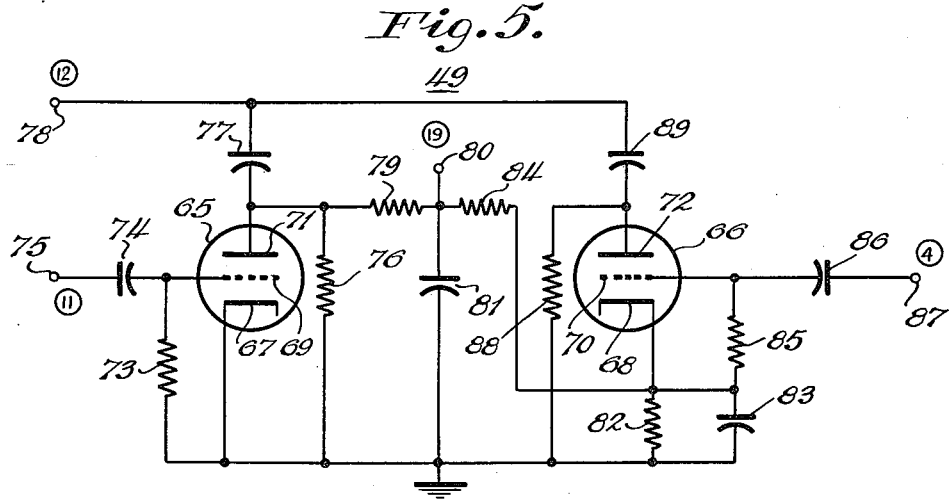
FIG. 5 is a schematic circuit diagram of block 49 of FIG. 1.

The difference circuit 49 of FIG. 5 comprises a pair of triode vacuum tubes 65 and 66, respectively having cathodes 67 and 68, control electrodes or grids 69 and 70, and output electrodes or anodes 71 and 72. Cathode 67 is grounded. A resistor 73 is connected between grid 69 and ground. A capacitor 74 is connected between grid 69 and a terminal 75, to which the narrow gate (curve 11) is applied.

A resistor 76 is connected between anode 71 and cathode 67. A capacitor 77 is connected between anode 71 and a terminal 78 to which the video signal (curve 12) is applied. Anode 71 is also connected, by means of a resistor 79, to an output terminal 80. A capacitor 81 is connected between output terminal 80 and ground.

Cathode 68 of vacuum tube 66 is connected to ground through a resistor 82, which is by-passed by a capacitor 83. Cathode 68 is also connected, through a resistor 84, to output terminal 80.

A resistor 85 is connected between grid 70 and cathode 68. A capacitor 86 is connected between grid 70 and a terminal 87, to which the noise gate (curve 4) is applied. Anode 72 is grounded through a resistor 88, and a capacitor 89 is connected between anode 72 and terminal 78.

In operation, each of tubes 65 and 66 operates as a diode detector when its grid is positive, to rectify the video signal (curve 12) which is applied to its anode. Grids 69 and 70 are normally negatively biased due to the flow of grid current respectively through resistors 73 and 85, so that normally little or no rectification takes place in either of vacuum tubes 65 and 66.

When the positive narrow gate (curve 11) is present at terminal 75, however, grid 69 becomes positive and vacuum tube 65 rectifies the video signal (curve 12) which is applied to its anode 71 by means of capacitor 77. As a result, a unidirectional voltage of the polarity indicated is developed across resistor 76. When the narrow gate applied to terminal 75 coincides with the echo signal which forms a part of the video signal applied to terminal 78, the potential developed across resistor 76 will be substantially proportional to the magnitude of the echo signal. Due to the presence of resistor 79, this potential drop tends to make output terminal 80 go negative relative to ground.

Similarly, vacuum tube 66 becomes conductive when grid 70 is positively biased due to the presence of the noise gate (curve 4) applied to terminal 87. The video signal which is applied to anode 72 of vacuum tube 66 by means of capacitor 89, therefore, is rectified and a unidirectional voltage of the polarity indicated is developed across resistor 82. The magnitude of this voltage is substantially proportional to the average value of the noise components of the video signal during the noise gate. Since the noise gate is purposely chosen to occur at a time when no echo signal is present, the voltage developed across resistor 82 is unaffected by the strength of the echo signal. By virtue of the presence of resistor 84, the potential drop across resistor 82 tends to make output terminal 80 go positive with respect to ground.

If the rectified output voltages developed respectively by vacuum tubes 65 and 66 are equal, output terminal 80 will remain substantially at ground potential. This will be true regardless of the absolute values of these two rectified voltages. This will be the circumstance when no echo signal is present, or when the echo signal which is present is of insufficient magnitude to rise above the noise components of the video signal occurring during the narrow gate.

When a relatively strong echo signal is received, on the other hand, the potential drop across resistor 76 will be substantially greater than that across resistor 82, since the noise level during the noise gate remains substantially unchanged from moment to moment. Accordingly, a difference voltage will be developed at output terminal 80, the polarity of this difference voltage being such that terminal 80 is negative relative to ground. Such a difference voltage is shown by curve 19 (FIG. 3).

Units 59, 60 and 61 are actuated by the difference voltage in such a manner that disconnect relay 62 (see FIG. 1) is energized, thus discontinuing the sweep of the narrow gate so that it remains locked on the echo signal. Due to the "memory" effect of unit 60, the system, if the echo signal disappears, will merely drift for a short time before resuming search operation.

One of the advantages of the difference circuit of FIG. 5 is that the time constants or both halves are the same with respect to ground. If these time constants were substantially different, a sudden change of signal and noise level, such as for example would result if the automatic gain control of receiver 46 (FIG. 1) were rendered operative or inoperative, would cause a spurious difference voltage to appear at output terminal 80. Although this voltage would disappear upon the restoration of normal operation, its momentary appearance might be sufficient to cause the system to change from search to track.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radar system adapted to radiate into space a pulse of electromagnetic energy and to intercept a portion of said energy reflected from a target, a ranging unit comprising: means for producing a first gate having adjustable time relation to said radiated pulse; searching means for periodically sweeping said time relation of said first gate between limits corresponding to predetermined minimum and maximum ranges from said system; tracking means for maintaining said first gate substantially in time coincidence with a reflected energy signal; means for producing a second gate having a time relation to said radiated pulse lying outside said limits; means for developing first and second voltages corresponding respectively to the reflected energy signal level during said first gate and to the noise level during said second gate; and means responsive to the difference between said first and second voltages for simultaneously rendering said searching means inoperative and said tracking means operative.

2. In a radar system adapted to radiate into space a pulse of electromagnetic energy and to intercept a portion of said energy reflected from a target, a ranging unit comprising: means for producing a first gate having adjustable time relation to said radiated pulse; searching means for periodically sweeping said time relation of said first gate between limits corresponding to predetermined minimum and maximum ranges from said system; tracking means for maintaining said first gate substantially in time coincidence with a reflected energy signal; means for producing a second gate having a time relation to said radiated pulse beyond the limit corresponding to said maximum range; means for developing first and second voltages corresponding respectively to the reflected energy signal level during said first gate and to the noise level during said second gate; and means responsive to the difference between said first and second voltages for simultaneously rendering said searching means inoperative and said tracking means operative.

3. In a radar system adapted to radiate into space a pulse of electromagnetic energy and to intercept a portion of said energy reflected from a target, a ranging unit comprising: means for producing a first gate having adjustable time relation to said radiated pulse; searching means for periodically sweeping said time relation of said first gate between limits corresponding to predetermined minimum and maximum ranges from said system; tracking means for maintaining said first gate substantially in time coincidence with a reflected energy signal; means for producing a second gate having a time relation to said radiated pulse lying outside said limits; means for developing first and second voltages corresponding respectively to the reflected energy signal level during said first gate and to the noise level during said second gate; and means responsive substantially solely to the difference between said first and second voltages for simultaneously rendering said searching means inoperative and said tracking means operative.

4. In a radar system adapted to radiate into space a pulse of electromagnetic energy and to intercept a portion of said energy reflected from a target, a ranging unit comprising: means for producing a first gate having adjustable time relation to said radiated pulse; searching means for periodically sweeping said time relation of said first gate between limits corresponding to predetermined minimum and maximum ranges from said system; tracking means for maintaining said first gate substantially in time coincidence with a reflected energy signal; means for producing a second gate having a time relation to said radiated pulse lying outside said limits; means for developing first and second unidirectional voltages having magnitudes proportional respectively to the reflected energy signal level during said first gate and to the noise level during said second gate; and means responsive substantially solely to the difference between said first and second voltages for simultaneously rendering said searching means inoperative and said tracking means operative.

5. In a radar system adapted to radiate into space a pulse of electromagnetic energy from a transmitter and to receive a portion of the echo signal in a receiver as reflected from a target, a ranging unit comprising; gate forming circuit means operating in synchronism with the transmitter to produce early and late gate signals, means for combining said early and late gate signals for producing a narrow gate signal for the receiver, signal generating means also operating in synchronism with the transmitter for producing a delayed noise gate signal, a difference circuit connected to receive said noise gate signal, the video output of the receiver, and the narrow gate signal, whereby when an echo signal is intercepted a negative wave appears at the output of said difference circuit, and means utilizing said negative wave and coacting with said gate forming circuit means for operating said system in a tracking mode.

References Cited in the file of this patent

UNITED STATES PATENTS

| | | |
|---|---|---|
| 2,335,265 | Dodington | Nov. 30, 1943 |
| 2,371,392 | Hollingsworth | Mar. 13, 1945 |
| 2,416,088 | Deerhake | Feb. 18, 1947 |
| 2,433,667 | Hollingsworth | Dec. 30, 1947 |
| 2,434,894 | Ambrose | Jan. 27, 1948 |
| 2,446,244 | Richmond | Aug. 3, 1948 |
| 2,467,208 | Hahn | Apr. 12, 1949 |
| 2,494,339 | Keister | Jan. 10, 1950 |
| 2,516,356 | Tull | July 25, 1950 |
| 2,572,986 | Chance | Oct. 30, 1951 |
| 2,628,349 | Nightenhelser | Feb. 10, 1953 |